United States Patent [19]

Mutsers

[11] Patent Number: 4,619,843
[45] Date of Patent: Oct. 28, 1986

[54] PROCESS FOR THE PREPARATION OF GRANULES

[75] Inventor: Stanislaus M. P. Mutsers, Geleen, Netherlands

[73] Assignee: Unie van Kunstmestfabrieken B.V., Utrecht, Netherlands

[21] Appl. No.: 643,025

[22] Filed: Aug. 21, 1984

[30] Foreign Application Priority Data

Aug. 27, 1983 [NL] Netherlands ............... 8302999

[51] Int. Cl.⁴ .............................. B05D 1/02
[52] U.S. Cl. .................... 427/213; 159/4.06;
159/47.2; 159/48.1; 159/DIG. 3; 159/DIG. 21;
159/DIG. 38; 71/64.02; 71/64.06; 261/78 A;
239/8; 239/403; 239/424
[58] Field of Search ............... 159/4.06, 43.1, 45,
159/47.2, 48.1, 47.1, DIG. 3, DIG. 21, DIG.
38; 71/64.06, 64.02; 260/707; 427/213; 261/78
A; 239/8, 9, 400, 403, 419.3, 424, 427.5, 428

[56] References Cited

U.S. PATENT DOCUMENTS 3,831,843  8/1974  Masai ............................... 239/8
4,217,127  8/1980  Kono et al. .................... 427/213
4,219,589  8/1980  Niks et al. ..................... 159/47.2

FOREIGN PATENT DOCUMENTS 2075908  11/1981  United Kingdom .

Primary Examiner—S. Leon Bashore
Assistant Examiner—Andrew J. Anderson
Attorney, Agent, or Firm—Cushman, Darby & Cushman

[57] ABSTRACT

Preparation of granules by making solid nuclei grow in a fluidized bed, by causing a liquid material to solidify thereon, the liquid material being introduced into the bed from the bottom upwards with the aid of a feeding device provided with a central channel through which the liquid material is supplied and a channel concentric therewith through which a powerful gas stream is supplied, which creates a rarefied zone in the bed above the feeding device, wherein the liquid material is made to exit from the central channel into the rarefied zone as a virtually closed, conical film, nuclei from the bed are carried through the film with the aid of the powerful gas stream and next, during transport of the so moistened nuclei through the rarefied zone, the liquid material taken up by the nuclei is allowed to solidify. By this process only a small amount of high-energetic gas is required, while very little agglomeration and dust formation occurs.

10 Claims, 5 Drawing Figures

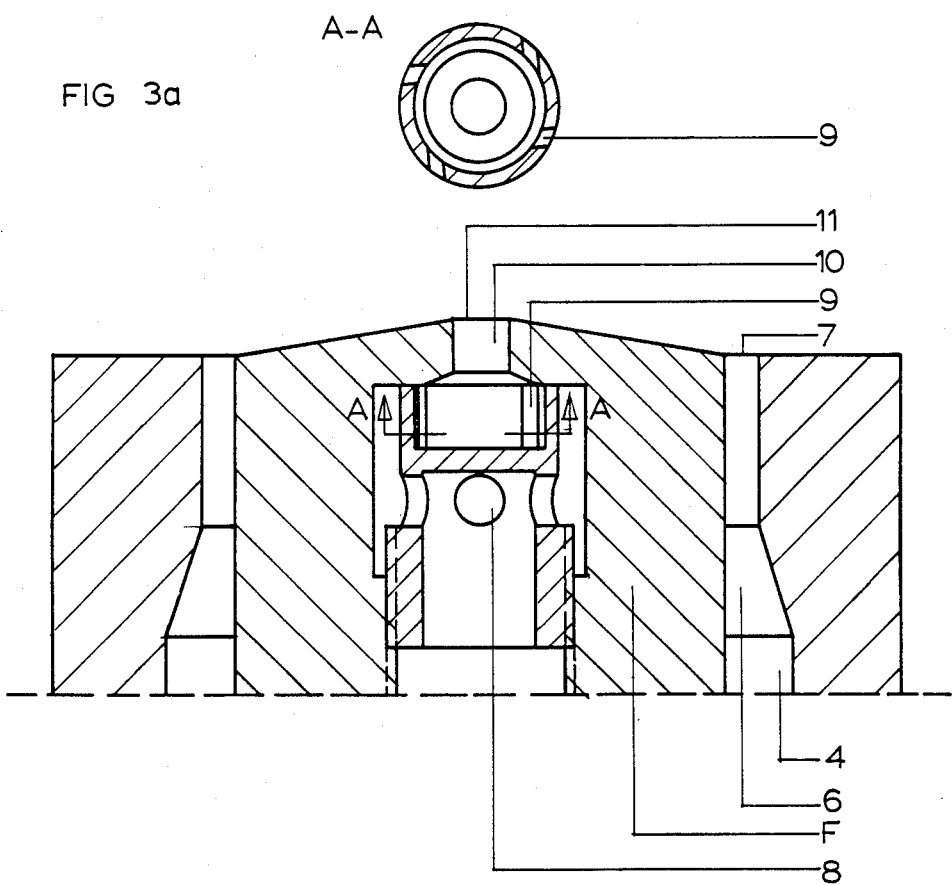

PROCESS FOR THE PREPARATION OF GRANULES

BACKGROUND OF THE INVENTION

The invention relates to a process for the preparation of granules by feeding a liquid material into a fluidized bed of solid nuclei, upon which the nuclei grow by solidification of the liquid material on them, and removal of the granules thus formed from the fluidized bed.

Such a process is known from, for instance, The Soviet Chemical Industry 4 (1972) No. 7, pp. 456–458, and 5 (1973), No. 4, pp. 265–267, and from Verfahrenstechnik 9 (1975) No. 2, pp. 59–64.

In these known processes, the liquid material, for example in the form of a solution, melt or suspension, is with the aid of a gas sprayed to droplets, which on the fluidized nuclei solidify to form granules of the desired size. In order for the granulation process to proceed well, it is necessary that the surface of the grown nuclei solidifies sufficiently quickly to prevent agglomeration of individual particles. It must be ensured, therefore, that the sprayed liquid material crystallizes quickly, and that the water present evaporates quickly. In the known processes this is achieved by spraying the liquid material to fine droplets, or even atomizing it. Of course, the rule here is that the more water is to be evaporated, the finer the atomization should be. The size of the droplets obtained in spraying is mainly determined by the pressure and the quantity of the spraying gas, the general rule being that as this pressure and quantity are higher, the drops obtained are smaller. It is therefore common practice to apply a spraying gas with a fairly high feed pressure, for example 1.5 bar or more, as described in, inter alia, Khim. Naft. Mashinostr. (1970) No. 9, pp. 41–42, and in U.S. Pat. No. 4,219,589, to obtain droplets of relatively small average diameter.

A disadvantage of these known processes is that for spraying the liquid material to droplets a large amount of gas of high pressure is required, which, of course, is accompanied by a high energy consumption. A possible explanation of this is that the liquid material contacts the gas as a jet. The jet is broken up into drops by the gas stream pealing the outer layers from the jet. This process continues along some distance in downstream direction. In this process, the gas is necessarily slowed down, resulting in progressively poorer atomization. In order still to achieve a sufficiently fine atomization, therefore, a high mass ratio of high-energetic gas to liquid material must be applied. It has been found that for sufficiently fine atomization of all liquid material this ratio should generally be higher than 1. Admittedly, it is possible to conduct this known spraying method with a lower mass ratio of gas to liquid material, but then a gas stream of very high feed pressure must be applied, for example more than 4 bar, which of course implies a very high energy consumption.

In principle, fine atomization can be achieved also by hydraulically spraying the liquid material, at very high liquid feed pressures (tens of bars). The energy consumption is then lower than in the previously described processes, but this method has the disadvantage of extreme wear on the spraying device. Moreover, serious agglomeration of nuclei in the fluidized bed is found to occur with this spraying method.

According to another known process, which is described in, for example, GB Nos. A 2,019,302 and GB A 2,075,908, in a fluidized-bed granulation process the liquid material is with the aid of a hydraulic sprayer divided into relatively large drops, which are subsequently finely atomized with the aid of a powerful gas stream. To this end, the liquid material is sprayed upward into the fluidized bed of nuclei via a sprayer provided with two concentric channels, the liquid material being supplied through the inner channel and the drops being contacted, shortly after leaving this channel, with a powerful gas stream supplied through the outer channel. By the powerful gas stream, above the sprayer a zone is created in the fluidized bed with a very low concentration of nuclei, the so-called rarefied zone, into which nuclei are sucked from the fluidized bed and moistened with droplets of liquid material. Although in this known process the required amount of high-energetic gas is lower than in the processes mentioned in the introduction, this amount is found to be still quite substantial. It has been found that for good atomization of all liquid material the required mass quantity of high-energetic gas must be more than 50% of the mass quantity of liquid material. Moreover it has been found that in the known processes, particularly during granulation of urea, a high formation of dust occurs. This implicates lost of production and serious environmental problems. Admittedly, during the granulation of urea this dust formation can be diminished by adding a large amount of formaldehyde to the liquid feed. This of course implies very high costs.

An essential part of all these known processes is, clearly, that the liquid material is converted to more or less fine droplets, which, as argued, is accompanied by a fairly high energy consumption and dust emission.

SUMMARY OF THE INVENTION

The invention now provides a process in which it is possible in a fluidized-bed granulation process to cause solid nuclei to grow to granules of the desired size by letting a liquid material solidify on them without the need first to convert this liquid material to fine droplets, so that a very small amount of high-energetic gas suffices, while still very little or no agglomeration of individual particles in the fluidized bed occurs and the amount of dust formed is very small.

The invention therefore relates to a process for the preparation of granules, which process comprises making solid nuclei grow, in a bed kept fluidized by a gas flowing upwards through the bed, by causing a liquid material to solidify on said nuclei, the liquid material being introduced into the fluidized bed of nuclei from the bottom upwards with the aid of at least one feeding device provided with a central channel through which the liquid material is supplied and a channel concentric therewith through which a powerful gas stream is supplied with a linear upward velocity higher than that of the fluidization gas, which powerful gas stream creates a rarefied zone in the bed above the feeding device, in which process the liquid material is made to exit from the central channel into the rarefied zone as a virtually closed, conical film, nuclei from the bed are carried through the film with the aid of the powerful gas stream, and next, during transport of the so moistened nuclei through the rarefied zone, the liquid material taken up by the nuclei is allowed to solidify, and the granules thus obtained are removed from the fluidized bed.

DETAILED DESCRIPTION OF THE PREFERRED EMBODIMENTS

Before hitting the film, the powerful gas stream sucks nuclei from the bed, entrains them and is thereby slowed down, so that both the film and the gas stream upon impact are deflected, and the entrained nuclei penetrate the film on account of their inertia and are thereby moistened with a small amount of liquid material, which subsequently, in the rarefied zone, can solidify to such an extent that after exiting the rarefied zone the particles are sufficiently dry to prevent agglomeration.

A closed conical film can, in principle, be obtained in various ways. For example, the liquid material can with the aid of a tapered part at the end of the outlet channel be converted to a film. Preferably, the conical film is obtained by giving the liquid material a rotation. Of course, besides the rotational speed given to the liquid material, also the hydrostatic pressure on the liquid material is important. In general, the liquid material is supplied under a hydrostatic pressure of 1.5 to 6 bar, in particular 2 to 4 bar. Advantageously a sprayer provided with a rotation chamber is used. In this arrangement, the liquid is under hydrostatic pressure pressed through one or more channels leading into the rotation chamber tangentially. The material thus brought into rotation is subsequently let out through an outlet channel which, in general, has a smaller diameter than the rotation chamber. The material, which in the form of a liquid film moves along the wall of the outlet channel, has a horizontal velocity component there resulting from the rotation, and a vertical velocity component depending on throughput. The vertex angle of the cone-shaped film formed after exit from the outlet channel is determined by the ratio of these two velocity components and should in general be 70°-100°, in particular 80°-90°. A smaller vertex angle is less desirable, since in that case it would become difficult, if not impossible, to achieve a sufficiently wide angle of impact with the powerful gas stream. On the other hand, a wider vertex angle is constructionally more complicated and offers little or no advantage.

It has been found to be advantageous that surface of the film has hardly any ripples, since then a uniform distribution of the liquid material over the passed-through nuclei is obtained. This is influenced by, among other things, providing the outlet part of the feeding device with a smooth wall. In addition, care should be taken that the liquid material in the film has not too high an internal turbulence. It has been found that for obtaining a sufficiently smooth film the dimensionless Weber number ($We_\delta$), expressed as $$We_\delta = \frac{\rho_L U_L^2 \delta}{\sigma_L},$$

should be smaller than 2,500, in particular smaller than 2,000 where $\pi_L$ is the density of the liquid material, in kilograms per cubic meter, $U_L$ is the potential velocity of the liquid material, in meters per second, $\sigma_L$ is the surface tension of the liquid material, in Newtons per meter; and $\delta$ is the film thickness upon exit from the central channel, in meters, It has been found that to this end the liquid velocity should in general be at most 30 m/sec and preferably 10-25 m/sec.

Further, for the process according to the invention it is essential that the powerful gas stream takes up nuclei and is thereby slowed down before hitting the film. This is advantageously achieved by making the gas channel lead into the fluidized bed in a lower place than the liquid channel. In this way, the gas stream can entrain nuclei along some distance and give them a certain velocity before they hit the film. This so-called free distance can vary within wide limits, for example from 0.5 to 5.0 cm, in particular between 1 and 2 cm.

In the present process, as the powerful gas stream air can be used, which is supplied with a velocity of at least 50 m/sec, in paticular 100-250 m/sec., in general under a feed pressure of 1.1 to 1.5 bar. The temperature of this gas stream can differ, partly depending on the nature of the liquid material to be granulated. In general, a gas stream is used with a temperature about equal to that of the liquid material. The required amount of this powerful gas stream is in the present invention exceptionally low. In general, a mass ratio of gas to liquid material of between 0.1:1 and 0.5:1, in particular between 0.2:1 and 0.4:1 is applied.

After exiting from the gas channel, the gas stream sucks nuclei from the bed and entrains them. The velocity of the gas stream thereby decreases, while the nuclei acquire a certain velocity, for example 0.5-5 m/sec. Upon impact with the film, the velocity of the gas stream has decreased to such an extent that the impulse of the gas and the impulse of the film are about equal. By impulse is meant here the product of mass flow rate and velocity. If upon impact the impulse of the film is much higher than that of the gas stream, the gas stream is strongly deflected outwards resulting in disturbance of the rarefied zone. On the other hand, if upon impact the impulse of the gas stream is much higher than that of the film, the film is forced inwards to such an extent that a considerable number of nuclei will no longer contact the liquid material and will therefore no longer be moistened. Upon impact, both the film and the gas stream are slightly deflected, virtually no gas-liquid mixing taking place. The extent to which the film is deflected inwards and the extent to which the gas stream is deflected outwards are determined by the above-mentioned impulses and, to a lesser extent, by the angle at which impact occurs. This angle is determined by the vertex angle of the film, and the angle at which the gas stream possibly converges. It has been found that after exiting from the gas channel the gas stream by itself slightly converges in the bed, so that in the majority of cases it is not necessary to apply a converging gas channel. Possibly, at the outlet opening the gas stream is made to converge under an angle of 5°-25°, in particular 5°-10°. In general, the angle of impact will be 50° to 85°, in particular 60°-70°.

When the film and the gas make impact, the nuclei entrained in the gas stream on account of their mass fly almost straight ahead, that is, through the film. These nuclei are thereby moistened with a small layer of liquid material, which completely or almost completely solidifies in the rarefied zone. The amount of liquid material taken up depends on, among other things, the film thickness and the particle diameter. The film thickness upon impact is generally 50-150 μm. The particle diameter may vary within wide limits, depending on the nature of the material, the size of the nuclei introduced into the bed, and the number of times such a nucleus has already been moistened.

The powerful gas stream does not only transport particles but also serves to create the rarefied zone above the feeding device. This zone should be of sufficient height to allow the liquid material on the particles to solidify to a sufficient extent, for example about 30 cm, but on the other hand it should be prevented, in view of dust emission, that the surface of the bed is locally broken. These conditions are determined by the mass and the velocity of the gas and the height of the bed, which is, for example, 40–100 cm.

It has been found that for a satisfactory granulation the width of the gas stream upon exit from the gas channel is important. In the case of a very wide gas zone, it is found that on the outer side of the gas stream a number of particles are carried along which are not moistened by the film. In the case of a very narrow gas zone, it is found that the particles carried along acquire insufficient speed. In general the width of the gas zone is chosen between 0.25 and 4 times the average diameter of the nuclei.

The present process can be used for the granulation of all kind of liquid materials, whether in the form of a solution, melt or suspension. The process is particularly suitable for the granulation of virtually water-free liquid materials. Examples of materials granulatable with the present process are ammonium salts, such as ammonium nitrate, ammonium sulphate or ammonium phosphate and mixtures thereof, single fertilizers such as calcium ammonium nitrate, magnesium ammonium nitrate, compound NP and NPK fertilizers, urea and urea-containing compounds, sulphur, organic substances such as bisphenol and caprolactam, and the like. The process is very suitable for the granulation of urea, while in that case on the one hand a product having a very high bulk density is obtained, and on the other hand such a small amount of dust is formed that the addition of formaldehyde to the liquid feed is substantially superfluous. The process is also suitable for applying liquid materials to nuclei of a composition which differs from that of the liquid material, such as the coating of fertilizer or urea particles with, for example, sulphur.

In the process according to the invention, the temperature of the liquid material to be granulated may vary within wide limits. In principle, this temperature should be chosen as near to the crystallization or solidification point of the material as possible to achieve quick crystallization or solidification. On the other hand, a certain temperature difference relative to this temperature is desirable, to prevent accretion of solid material around the outlet opening of the feeding device. In general, a liquid material with a temperature about 5°–15° C. above the crystallization or solidification temperature is used.

As nuclei in the fluidized bed, in principle all kind of pellets can be used, for example prills separately prepared from a portion of the liquid material to be sprayed, or from a melt obtained by melting of the oversize fraction obtained after screening of the granulate. Advantageously as nuclei granules are used which have been obtained during screening and/or crushing of the granulate obtained from the bed. The average diameter of these nuclei may vary, partly depending on the nature of the material to be granulated and especially on the desired particle size of the product. Also the quantity of nuclei introduced may vary.

The bed of nuclei is kept in a fluidized state by an upward-flowing gas, in particular air. This fluidization gas should have a minimum superficial velocity to ensure that the bed is completely kept in a fluidized state. On the other hand, this velocity should be as low as possible, in connection with energy costs and to prevent dust emission. In general, a fluidization gas with a superficial velocity of 1.5–2.5 m/sec., more in particular 1.8–2.3 m/sec. is used. The temperature of the fluidization gas may vary, partly depending on the desired bed temperature, which, as usual, is set by a convenient choice of the temperature of the material to be sprayed, the spraying gas, the nuclei supplied and the fluidization gas.

The invention will be explained in detail with reference to the accompanying drawings without, however, being limited thereto.

FIG. 3 represents a longitudinal section of the outlet part of a spraying device where gas outlet opening and liquid outlet opening have been provided at about equal vertical heights. FIG. 3A represents schematically a cross section of the rotation chamber in such a sprayer, viewed from the top.

Figure 1:
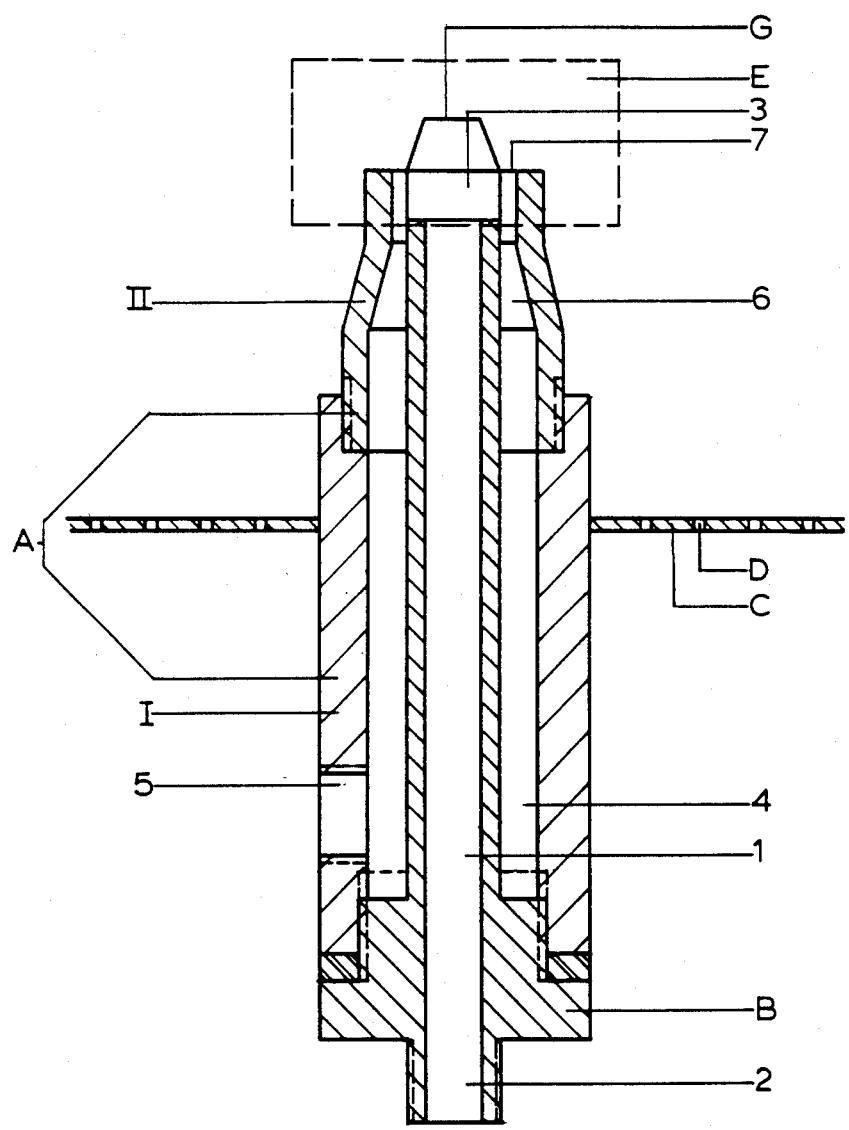
FIG. 1 represents a longitudinal section of the spraying device with which the process according to the invention can be conducted.

In FIG. 1, the spraying device is given the general designation A and is composed of a feeding section I and a spraying section II. The spraying device is mounted in the granulation installation (omitted from the drawing) with bottom part B and fitted in the bottom plate C, which has been provided with perforations D for admitting fluidization air, and discharges via outlet opening G. The spraying device is composed of a central channel 1, which at one end connects with a liquid line omitted from the drawing and at the other end leads into a rotation chamber 3. Further, the spraying device is provided with a channel 4 which has been fitted concentrically around the central channel, channel 4 being at one end via opening 5 connected to a gas line omitted from the drawing and at the other end provided with a narrowing part 6, which terminates into outlet opening 7. The outlet section E surrounded by the dotted rectangle in the Figure is represented in detail in FIG. 2.

Figures 2, 2A:
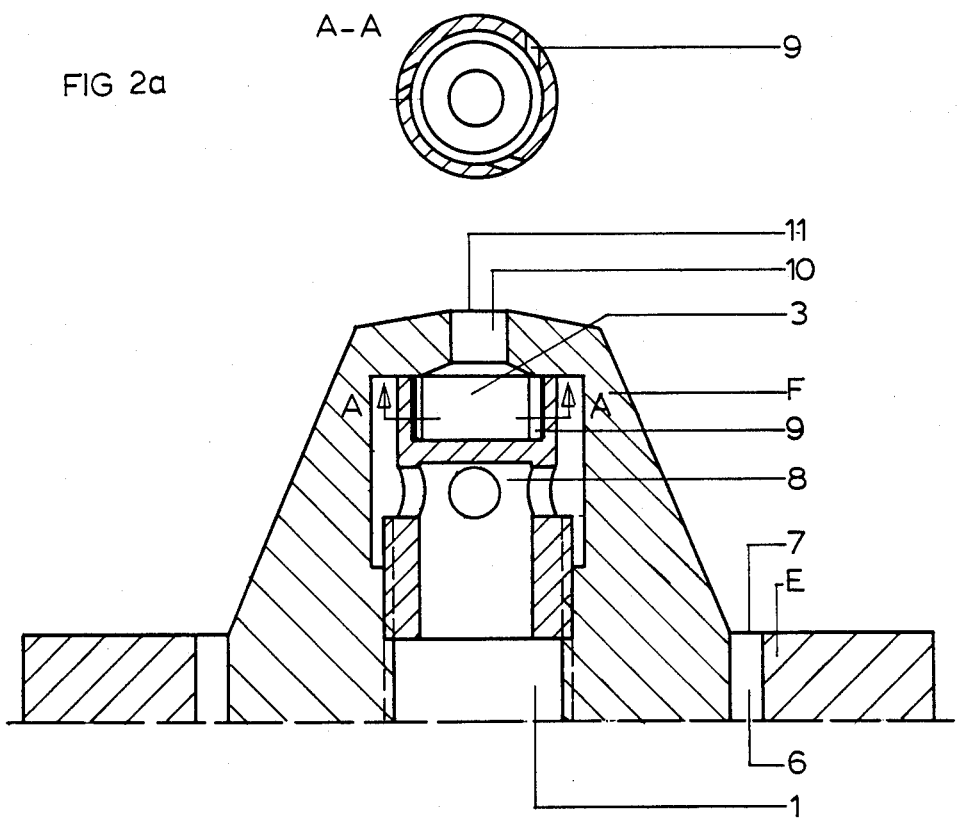
FIG. 2 represents a longitudinal section of the outlet part of such a spraying device, FIG. 2A representing schematically a cross section of the rotation chamber in such a sprayer, viewed from the top.

In FIG. 2, the outlet part of the spraying device is given the general designation E. It is composed of a liquid-outlet F around which a narrowing gas channel 6 provided with outlet opening 7 has been fitted. The liquid outlet F is composed of a liquid feeding channel 1, which via openings 8 and feed slots 9 connects with a rotation chamber 3, which has been provided with central outlet channel 10 with outlet opening 11.

In FIG. 2A a schematic cross section along line A—A of the rotation chamber 3 of FIG. 2 is indicated. The feed slots are indicated by 9.

In FIG. 3 a modified outlet section of the spraying device is represented. It differs from the embodiment according to FIG. 2 in that the liquid outlet opening 11 is at about the same height as the gas outlet opening 7.

EXAMPLE 1

To a circular fluidized-bed granulator with a diameter of 27 cm and provided with a perforated bottom plate (hole diameter 2 mm), which granulator contained a bed of ammonium nitrate particles with a height of approximately 60 cm, continuously an ammonium nitrate melt and a powerful air stream were supplied via a spraying device as represented in FIGS. 1 and 2. In this process, an ammonium nitrate melt containing 0.65 wt. % $H_2O$, 2.0 wt. % dolomite and 2.0 wt. % clay and having a temperature of 182° C. was supplied via the central channel (1) of the spraying device at a rate of 195 kg/h and under a feed pressure of 2.7 bar. As clay, a product was used which is available under the name of Sorbolite from the Tennessee Mining and Chemical Corporation, with a particle size of less than 5 μm and consisting mainly of $SiO_2$ (73 wt. %) and $Al_2O_3$ (14 wt. %). The powerful air stream was supplied via a gas channel (4) fitted concentrically with the central channel, at a rate of 50 kg/h, with a temperature of 180° C. and under a feed pressure of 1.4 bar. The spraying device had been provided with a rotation chamber (3) into which the melt was introduced with the aid of 4 tangentially arranged small liquid channels (9).

The most important dimensions of this spraying device were as follows:

| | |
|---|---|
| Diameter of central channel (1): | 12 mm |
| Diameter of concentric channel (4): | 32 mm |
| Diameter of outlet opening (11) of central channel: | 3 mm |
| Gap width of outlet opening (7) of concentric channel: | 1.2 mm |
| Vertical distance from outlet opening of gas channel (11) to bottom plate (C): | 4 cm |
| Vertical distance from outlet opening of gas channel (11) to outlet opening of liquid channel (7): | 1.8 cm |
| Angle of convergence of the outside of the wall of the liquid channel: | 22.5° |
| Outside diameter of gas channel: | 23.4 mm |

The liquid exited from the central channel in the shape of a closed conical film with a film thickness upon exiting of about 275 μm, a vertex angle of 87° and a velocity of 15.5 m/sec. The film had a little-rippled surface as a result of the low internal turbulence ($We_\delta$ was approximately 1400). The air stream exited from the concentric gas channel with a velocity of 200 m/sec. Although the gas channel did not converge, the gas stream was found to converge by a few degrees. Upon impingement of the particle-laden gas stream and the film it was found that hardly any mixing of the two occurred.

To the bed also about 180 kg/h of solid ammonium nitrate particles were supplied with an average diameter of 1-1.5 mm and a temperature of about 80° C., which had been obtained in screening and crushing of the granulate discharged from the bed.

The bed of particles had a temperature of about 135° C. and was fluidized with an upward air stream having a temperature of about 70° C. and a superficial velocity of 2.1 m/sec.

Via an overflow, granules (temperature approx. 135° C.) were continuously discharged from the bed and cooled to about 90° C. in a drum cooler, countercurrent to air. The cooled granules were subsequently screened through flat Engelsmann sieves (aperture size 2 and 4 mm).

In this operation, 166 kg/h of a screening fraction with a diameter of less than 2 mm was obtained, which fraction was returned to the bed, and 14 kg/h of a screening fraction with a diameter of more than 4 mm, which fraction was with the aid of a roller crusher crushed to a $\delta_{50}$ of 1.1 mm. The fine dust (smaller than 750 μm) was separated out with a wind sifter, after which the residual crushed material was returned to the bed.

As product screening fraction (2-4 mm) about 193 kg/h of granules were obtained, which were cooled to 40° C. in a drum. The granules thus obtained had the following properties:

| | |
|---|---|
| Nitrogen content: | 33.7 wt. % |
| $H_2O$ content: | 0.15 wt. % |
| Rolling capacity: | 80% round |
| Bulk density: | 935 kg/m³ |
| Impact resistance: | 100% |
| Crushing strength: | 60 bar |
| Oil absorbing capacity: | 0.60 wt. % |
| Mercury penetration: | 0.085 cm³/g. |

A portion of this product was five times heated and cooled between 15° and 50° C. The granules thus treated had a crushing strength of 50 bar and an oil-absorbing capacity of 2.2 wt. %. The crushing strength was measured by placing a granule between two plates and exerting a gradually increasing pressure on the top plate, until such a pressure was reached that the granule broke. The rolling capacity was determined by bringing granules on a rotating disc mounted at an angle of 7.5° and measuring the percentage of granules sliding downward. The impact resistance was determined by shooting pellets against a plate mounted at an angle of 45° and measuring the roundness percentage before as well as after the treatment.

The dust-containing fluidization air (temperature about 135° C.) coming from the bed was sent to a wet washer, where a dilute ammonium nitrate solution was obtained (about 35 wt. %). This solution was evaporated and added to the ammonium nitrate melt supplied to the bed. The dust-laden air streams from the coolers and the crusher section were with a bag filter freed from dust. The ammonium nitrate dust thus obtained was dissolved in the hot ammonium nitrate melt supplied to the bed.

EXAMPLE II 195 kg/h of ammonium nitrate melt containing 0.39 wt. % water and 0.3 wt. % $Mg(NO_3)_2$ (calculated as MgO) were with a temperature of 180° C. and under a feed pressure of 1.9 bar introduced into a fluidizedbed granulator which was like the one described in Example I but had been provided with a sprayer as represented in FIG. 3. In addition, 55 kg/h of air with a temperature of 180° C. was under a feed pressure of 1.5 bar introduced via the spraying device. The conical liquid film coming from the central channel (diameter of outlet opening 4 mm) had a thickness of about 300 μm, a velocity of 11.9 m/sec. and a vertex angle of 90° ($We_\delta$ about 1000). The exiting air stream had a velocity of 195 m/sec. To the bed, which had a temperature of 115° C. and was fluidized with air having a temperature of 40° C. and a superficial velocity of 2.1 m/sec., also about 175 kg/h of solid particles obtained from the screening and crushing sections were supplied.

The granules discharged from the bed via an overflow were—as described in Example I—cooled to 90° C. in a drum and screened, about 190 kg/h of product fraction (2-4 mm) being obtained, which was cooled to 40° C. in a drum.

The granules thus obtained had the following properties:

| | |
|---|---|
| Nitrogen content: | 33.8 wt. % |
| H$_2$O content: | 0.15 wt. % |
| Bulk density: | 965 kg/m$^3$ |
| Rolling capacity: | 95% round |
| Impact resistance: | 100% |
| Crushing strength: | 45 bar |
| Oil-absorbing capacity: | 0.90 wt. % |
| Mercury penetration: | 0.04 cm$^3$/g |

A portion of this product was five times heated and cooled between 15° and 50° C. The granules thus treated had a crushing strength of 45 bar and an oil absorption capacity of 1.9 wt. %.

EXAMPLE III

To a circular fluidized-bed granulator with a diameter of 46 cm, containing a bed (100° C.) of urea particles (height about 60 cm), which bed was fluidized with air having a temperature of 35° C. and a superficial velocity of 2.0 m/sec., 180 kg/h of solid urea particles were supplied which had been obtained in screening and crushing of the granulate from the bed.

In addition, with the aid of a spraying device as described in Example I a urea melt and a powerful air stream were introduced into the bed in upward direction. The urea melt had a temperature of 140° C., a water content of 0.5 wt. % and a formaldehyde content of 0.2 wt. %, and was supplied in an amount of 195 kg/h under a feed pressure of 3.3 bar. The powerful air stream had a temperature of about 140° C. and was supplied in an amount of 50 kg/h under a feed pressure of 1.4 bar.

The urea melt exited from the spraying device in the shape of a little-rippled (We$_\delta$=1950) conical film with a vertex angle of 88°, a film thickness of about 300 μm and an exiting velocity of 20 m/sec. The air stream exited from the spraying device with a velocity of about 190 m/sec.

Via an overflow the granules were discharged from the bed, cooled to about 40° C. in the fluidized-bed cooler and subsequently separated by screening into a product fraction of 2-4 mm (190 kg/h), a fraction smaller than 2 mm (165 kg/h) and a fraction larger than 4 mm (15 kg/h). The latter fraction was crushed and returned to the bed together with the fraction smaller than 2 mm.

The product granules had the following properties:

| | |
|---|---|
| H$_2$O content: | 0.04 wt. % |
| Formaldehyde content: | 0.3 wt. % |
| Bulk density: | 770 kg/m$^3$ |
| Rolling capacity: | 90% round |
| Crushing strength: | 60 bar |
| Impact resistance: | 100% |

EXAMPLE IV

To a circular fluidized-bed granulator with a diameter of 46 cm, containing a bed (100° C.) of urea particles (height about 60 cm), which bed was fluidized with air having a temperature of 110° C. and a superficial velocity of 2.0 m/sec., 180 kg/h of solid urea particles were supplied which had been obtained in screening and crushing of the granulate from the bed.

In addition, with the aid of a spraying device as described in Example I a urea melt and a powerful air stream were introduced into the bed in upward direction. The urea melt had a temperature of 140° C., a water content of 1.20 wt. % and contained no formaldehyde, and was suplied in an amount of 195 kg/h under a feed pressure of 3.3 bar. The powerful air stream had a temperature of about 140° C. and was supplied in an amount of 88 kg/h under a feed pressure of 0.40 bar.

The urea melt exited from the sparying device in the shape of a little-rippled (We$_\delta$=1950) conical film with a vertex angle of 88°, a film thickness of about 300 μm and an exiting velocity of 20 m/sec. The air stream exited from the spraying device with a velocity of about 190 m/sec.

Via an overflow the granules were discharged from the bed, cooled to about 40° C. in the fluidized-bed cooler and subsequently separated by screening into a product fraction of 2-4 mm (190 kg/h), a fraction smaller than 2 mm (165 kg/h) and a fraction larger than 4 mm (15 kg/h). The latter fraction was crushed and returned to the bed together with the fraction smaller than 2 mm.

The product granules had the following properties:

| | |
|---|---|
| H$_2$O content: | 0.04 wt. % |
| Formaldehyde content: | 0 wt. % |
| Bulk density: | 760 kg/m$^3$ |
| Rolling capacity: | 90% round |
| Crushing strength: | 43 bar |
| Impact resistance: | 100% |
| Dust emission | 0.6% of the feed |

EXAMPLE V

To a circular fluidized-bed granulator (diameter 44 cm), containing a bed (temperature 43° C.) of sulphur particles (average diameter 2.90 mm) with a height of about 55 cm, continuously about 150 kg/h of sulphur particles with an average diameter of 1.0–1.5 mm and a temperature of 36° C. were supplied which had been obtained in screening and crushing of the granulate from the bed. The bed was fluidized with an upward air stream having a temperature of about 20° C. and a superficial velocity of 2.0 m/sec.

In addition, with the aid of a spraying device as described in Example I 150 kg/h of sulphur melt with a temperature of 135° C. and a feed pressure of 3.1 bar and 55 kg/h of air with a temperature of about 135° C. and a feed pressure of 1.7 bar were supplied to the bed. The sulphur melt exited from the spraying device in the shape of a virtually smooth film (We$_\delta$: about 1000) with a velocity of 12.5 m/sec., a film thickness of about 280 μm and a vertex angle of 87°. The powerful air stream exited with a velocity of about 175 m/sec.

The granules discharged from the bed via an overflow were by screening separated into a fraction smaller than 2.5 mm (112 kg/h), a fraction larger than 4.5 mm (38 kg/h), which latter fraction was crushed to an average size of 1.0–1.5 mm and returned to the bed together with the fine fraction, and a product fraction with a diameter of 2.5–4.5 mm (about 145 kg/h), which had the following properties:

| | |
|---|---|
| Bulk density: | 1130 kg/m$^3$ |
| Rolling capacity: | 20% round |
| Crushing strength: | 35 bar |
| Impact resistance: | 20% |
| Dustiness number | 20 |

-continued

| | |
|---|---|
| δ₅₀: | 2.90 mm |

EXAMPLE VI

In the same way as in Example I, 180 kg/h of calcium ammonium nitrate particles (temperature about 100° C., average diameter about 1.5 mm) were supplied to a bed of calcium ammonium nitrate particles (temperature 105° C.) kept fluidized with air (temperature 20° C.; superficial velocity 2 m/sec.). In addition, with a spraying device as described in Example I 200 kg/h of calcium ammonium nitrate melt (nitrogen content 26 wt. %; CaCO₃ content 24 wt. %; H₂O content 0.75 wt. %) was supplied with a temperature of 172° C. and under a feed pressure of 2.7 bar, and 50 kg/h of a powerful air stream with a temperature of 166° C. and under a feed pressure of 1.4 bar. The conical film (vertex angle 88°) exiting from the spraying device had a velocity of 14.5 m/sec., a film thickness of about 270 μm and a Weber number of about 1200. The air stream exited with a velocity of about 200 m/sec.

The granulate discharged from the bed was screened hot. The fraction larger than 4 mm was crushed and returned to the bed together with the fraction smaller than 2 mm.

The 2–4 mm fraction was in a drum cooled to about 40° C. and was discharged as product. The product had the following properties:

| | |
|---|---|
| H₂O content: | 0.09 wt. % |
| Bulk density: | 1005 kg/m³ |
| Rolling capacity: | 85% round |
| Impact resistance: | 100% |
| Crushing strength: | 45 bar |

What we claim is:

1. A process for the preparation of solid granules from a liquid material which process comprises the steps of:
   (1) forming and maintaining in a vessel, and above a feeding device therein, a fluidized bed of solid particulate nuclei by upwardly flowing a first low velocity fluidizing gas stream through said bed, said feeding device comprising:
   (a) a first central conduit for delivering an upward flow of starting liquid material into said vessel from the exit of said first conduit in the form of a virtually closed conical film,
   (b) said first central conduit including means for imparting a horizontal velocity component to said starting liquid prior to its exit, and
   (c) a second concentric conduit annularly disposed about said first conduit for delivering an upward flow of a second gas stream into said vessel from the exit of said second conduit;
   (2) introducing said starting liquid into said vessel through said first central conduit at velocity sufficient to form said cone,
   (3) introducing, through said concentric annular conduit, said second gas stream into said vessel at an initially high velocity relative to the velocity of said first gas stream thereby forming a rarified zone of solid nuclei above the said exits of said conduits, whereby
   (a) there is formed a virtually closed conical film of said liquid within said rarified zone, and
   (b) said solid nuclei are entrained in said second gas stream before said second gas stream hits said conical film, so that
   (c) said entrained solid nuclei impact with said conical film thereby moistening said solid nuclei, and
   (d) the liquid material taken up by the nuclei is allowed to solidify causing the solid nuclei to grow in size, and
   (4) thereafter removing the thus obtained granules from said vessel.

2. A process according to claim 1, wherein the liquid material is supplied under a pressure of 1.5 to 6 bar, and is brought into rotation in the feeding device.

3. A process according to claim 1, wherein the film has such an internal turbulence that the Weber number, expressed as $$We_\delta = \frac{\rho_L U_L^2 \delta}{\sigma_L},$$

is smaller than 2,500, and where
  $\rho_L$ is the density of the liquid material, in kilograms per cubic meter,
  $U_L$ is the potential velocity of the liquid material, in meters per second,
  $\sigma_L$ is the surface tension of the liquid material, in Newtons per meter, and
  $\delta$ is the film thickness upon exit from the central channel, in meters.

4. A process according to claim 3, wherein the potential velocity of the liquid material is 10 to 25 meters per second.

5. A process according to claim 1, wherein the liquid material is introduced into the bed in a higher place than the second gas stream.

6. A process according to claim 5, wherein the vertical distance between the levels at which the liquid material and the second gas stream are introduced into the bed is 0.5–3.0 cm.

7. A process according to claim 1, wherein the second gas stream is applied with a velocity of 50–250 m/sec., under a feed pressure of 1.1 to 1.5 bar.

8. A process according to claim 1, wherein a mass ratio of the second gas stream to liquid material of between 0.1:1 and 0.5:1 is applied.

9. A process according to claim 8, wherein a mass ratio of the second gas stream to liquid material of between 0.2:1 and 0.4:1 is applied.

10. A process according to claim 1, wherein the concentric annular conduit converges at the outlet under an angle of at most 25°.

* * * * *